US008984905B2

(12) United States Patent
Okano

(10) Patent No.: US 8,984,905 B2
(45) Date of Patent: Mar. 24, 2015

(54) DESICCANT AIR-CONDITIONER

(75) Inventor: Hiroshi Okano, Fukuoka (JP)

(73) Assignee: Seibu Giken Co., Ltd, Fukuoka (JP)

( * ) Notice: Subject to any disclaimer, the term of this patent is extended or adjusted under 35 U.S.C. 154(b) by 264 days.

(21) Appl. No.: 13/067,369

(22) Filed: May 26, 2011

(65) Prior Publication Data

US 2011/0289955 A1 Dec. 1, 2011

(30) Foreign Application Priority Data

May 31, 2010 (JP) ................................. 2010-124240

(51) Int. Cl.
*F25D 23/00* (2006.01)
*F24F 3/14* (2006.01)

(52) U.S. Cl.
CPC ............... *F24F 3/1423* (2013.01); *Y02C 10/08* (2013.01)
USPC ............................................... 62/241; 62/476

(58) Field of Classification Search
CPC ............................... F24F 3/1423; Y02C 10/08
USPC .......... 62/271, 93, 94, 476, 483; 96/125, 126, 96/145
See application file for complete search history.

(56) References Cited

U.S. PATENT DOCUMENTS 6,165,254 A * 12/2000 Kawakami et al. ............. 96/125
7,041,272 B2 * 5/2006 Keefer et al. ................. 423/651
7,344,688 B2 * 3/2008 Carra et al. .................. 423/249
7,524,334 B2 * 4/2009 Haidukewych ............ 623/20.32
7,731,785 B2 * 6/2010 Choi et al. ...................... 96/126
2007/0163279 A1 * 7/2007 Moffitt ............................ 62/271

FOREIGN PATENT DOCUMENTS

JP 2000-280724 10/2000
JP 2001-47844 2/2001
JP 2009-52753 3/2009

* cited by examiner

*Primary Examiner* — Mohammad M Ali
(74) *Attorney, Agent, or Firm* — Staas & Halsey LLP

(57) ABSTRACT

A desiccant air conditioner has a high energy efficiency due to the absence of excessive heat loss due to ventilation. In order to meet this requirement, the desiccant air conditioner is equipped with a honeycomb rotor wash-coated with agents having capabilities of absorptions of humidity, carbon dioxide and nitrogen, and this honeycomb rotor is divided into at least an absorption zone and a desorption zone. The air in a room is, after being passed through the absorption zone, fed back to the room, and the air which is passed through the desorption zone is exhausted into outside of the room. In this way, carbon dioxide and nitrogen in a room, the latter quantity being corresponded to that of the consumed oxygen in the room, are exhausted into outside of the room, allowing to exhaust carbon dioxide and at the same time to keep the oxygen density to within an allowed limit without the need of excessive ventilation.

12 Claims, 4 Drawing Sheets

1
2
3
4
5
6
7

DESICCANT AIR-CONDITIONER

CROSS REFERENCE TO RELATED APPLICATIONS

This application is based upon and claims the benefit of priority from Japanese Patent Application No. 2010-124240 filed on May 31, 2011, the entire contents of which are incorporated herein by reference.

BACKGROUND

This invention is concerned with a desiccant air conditioner, where humidity-absorbing agents such as silica-gel or zeolite are used, and provides a system which could improve air-quality in a room without the necessity of ventilation.

The desiccant air conditioner employs humidity-absorbing agents to provide dry air, thereby yielding air with very low dew point compared with a conventional dehumidifier by refrigeration process. In addition, the desorption process in the humidity-absorbing agents can be carried out using exhaust gas from an internal combustion engine, for example, thus yielding high potential of energy saving.

To add to this, high-humidity gas is produced in the process of dry gas production, and the former can be supplied to a room to add humidity there.

This type of the decicant air conditioner is not only being employed for air conditioning of buildings, but its possible application to air-conditioner for hybrid cars is now actively pursued. In the latter case, hybrid cars have high overall energy efficiency, implying the amount of heat available from exhaust gas to be insufficient for defrosting windscreens. As techniques for the latter case, the patent documents 1 and 2 have been disclosed.

[Patent document 1] JP 2000-280724

[Patent document 2] JP 2001-47844

[Patent document 3] JP 2009-52753

In the patent document 1, room air in a car is circulated so as to reduce heat loss due to ventilation and at the same time to secure fresh air which is supplied only to avoid excessive $CO_2$ accumulation in the car.

However, the process described in the patent document 1 still requires ventilation, thereby yielding a problem of energy loss.

Further, the patent document 2 describes an air conditioner for a car, where dehumidifying efficiency be improved by energy saving. For example, the section 0003 describes a problem caused by ventilation. In order to cope with this, the section 0004 describes a reduction of the amount of ventilation air.

However, some ventilation is necessary, and the problem of energy loss due to this ventilation cannot be overcome.

Further, the process disclosed in the patent document 3 utilizes a honeycomb rotor to absorb poisonous gas and carbon dioxide in a room and then to exhaust them to outside. This process exhausts only these gases, and thus has much higher energy efficiency compared with that trying to reduce room densities of these gases by ventilation.

However, the process disclosed in the patent document 3 has a problem of gradually reducing oxygen density in the room for an extended period of use. The present invention tries to avoid energy loss by ventilation, but still keep the room air clean enough by employing the desiccant air conditioner.

SUMMARY

In order to overcome the above-mentioned problems, this invention introduces a honeycomb rotor with at least wash-coated humidifying and $CO_2$ absorbing agents, with this rotor having at least two zones with one for absorption and the other for desorption, and the absorption zone is circulated with room air and the air degassed during the desorption zone is exhausted to outside.

The air-conditioner based on this invention is composed as described above such that carbon dioxide produced by human is absorbed in the honeycomb rotor and exhausted during the passage of the desorption zone. In this process, oxygen in the room is consumed, but nitrogen is also absorb/desorbed by wash-coating nitrogen absorbing agents into the rotor, thus keeping the oxygen density in the room. Incidentally, atmospheric compositions are about 78% nitrogen, about 21% oxygen and about 1% others, thus the oxygen composition is kept at around 21% if we could make the system exhausting the ratio of carbon dioxide 1/nitrogen 4 so that nitrogen is exhausted, the amount of which exactly corresponds to the consumed oxygen in the atmospheric composition in the room.

On the other hand, the allowable upper limit of carbon dioxide is regulated as 0.1% by the Building Standards of Japan (0.5% by the national occupational health and safety laboratory of the United States and American Conference of Governmental Industrial Hygienists (ACGIH). Because the amount of carbon dioxide in a room directly affects human health, it is usually thought to be necessary to have ventilation of 30 $m^3$/h for an individual person in the room. However, if carbon dioxide and nitrogen, the latter amount being corresponded to the amount of consumed oxygen, can be exhausted from the room, it is possible to keep both the densities of carbon dioxide and oxygen in the room without the necessity of ventilation of 30 $m^3$/h.

For example, the amount of carbon dioxide exhaust per person is 0.02 $m^3$/H, then combining with an exhaust of nitrogen of 0.08 $m^3$/H, one needs to ventilate the amount of 0.1 $m^3$/H. This is only 1/300 of the amount of ventilation required to meet the allowable carbon dioxide density, decided by the Building Standards.

In addition, the desiccant air conditioner based on the present invention has a wash-coated honeycomb rotor, so that dehumidification of a room can also be carried out simultaneously.

Additionally, the honeycomb rotor can be wash-coated with absorbing agents of volatile organic compounds (VOCs hereafter), so that VOCs can also be diminished from the room, thus enabling to improve the air quality further.

Particularly in recent years, opto-chemically induced smog have been reported to appear very frequently in large city areas, and it is feared to take in these smog into a room if one ventilate room air. In addition, exhaust gases from automobiles along busy roads and odorous smells exited from kitchens in central urban areas might also be taken into the room by ventilation. However, if the desiccant air-conditioner is employed, the air in the room can be purified without the necessity of ventilation, thus eliminating the above-mentioned problems.

The invention described in claim 1 can be carried out by installing a honeycomb rotor which is wash-coated with agents having at least humidity absorbing capability or absorption process and/or carbon dioxide absorbing capability or absorption process, and the rotor is divided into at least absorbing and desorbing sections, thereby the air passing through the absorbing section being fed back into the room again while the air passing through the desorption section being exhausted to outside of the room. In this way, some fractions of carbon dioxide and nitrogen are exhausted into outside, while keeping the densities of carbon dioxide and oxygen within respective allowable limits.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
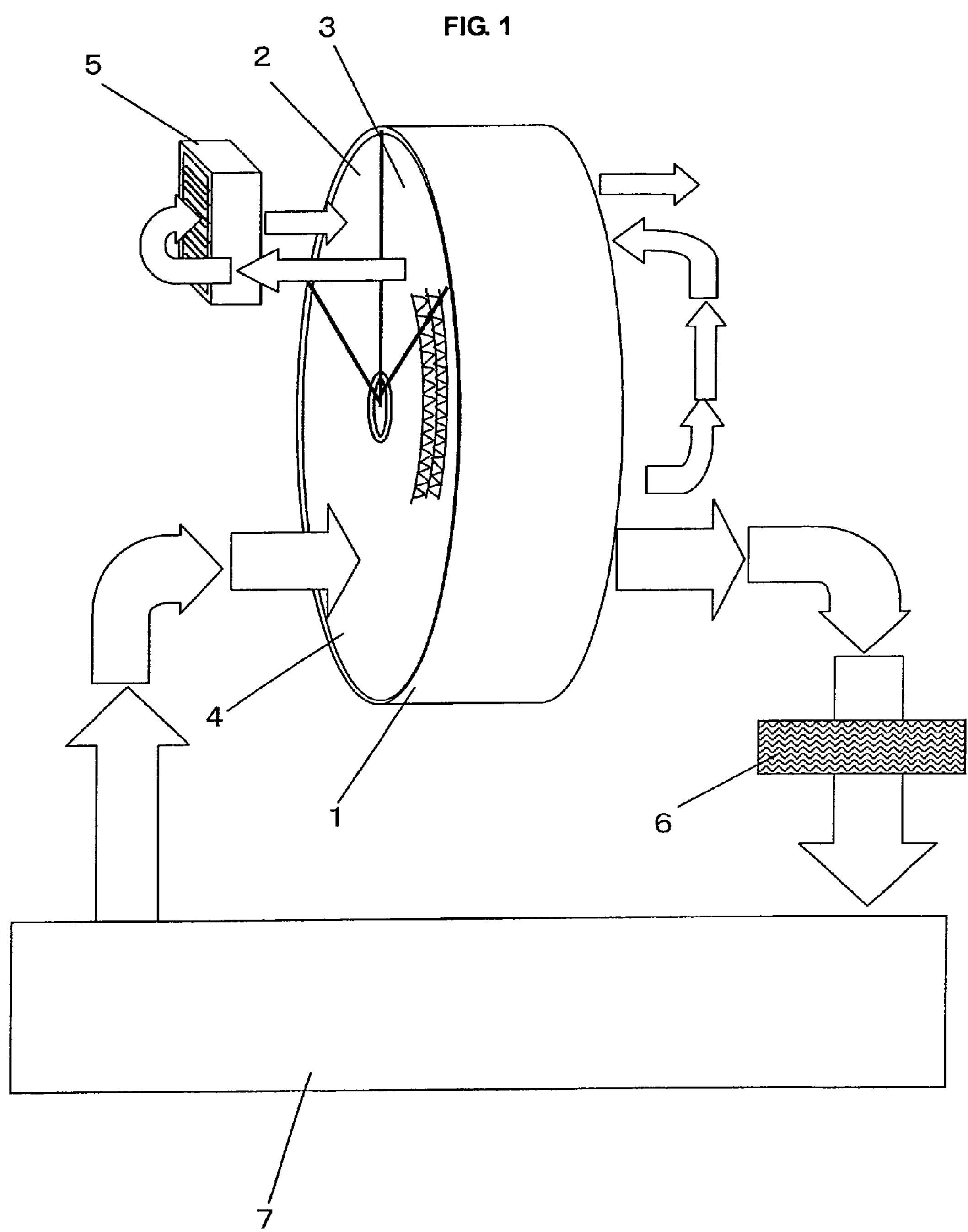
FIG. 1 shows the air flow of the first embodiment of the invention.

Reference will now be made in detail to the preferred embodiments of the present invention, examples of which are illustrated in the accompanying drawings, wherein like reference numerals refer to like elements throughout.

In the following, examples of practical applications of the decicant air conditioner based on the present invention are described in detail using the attached figure. The number 1 in the figure shows a honeycomb rotor, which is shaped into a rotor using non-flammable sheets such as ceramic fiber papers being corrugated (wave-like structured), and the rotor is wash-coated with inorganic humidity absorbing agents such as silica-gel and hydrophilic zeolite or with polymeric humidity absorbing agents such as ion exchange resin and polymeric adsorbent material or with other humidity absorbing agents such as lithium chloride.

In addition, the honeycomb rotor is wash-coated with calcium carbonate, sodium carbonate, tri-ethanol amine, mono-ethanol amine, hydrotalcite and ion exchange resin. The zeolite families of CaA, NaX, CaX, LiLSX and NaLSX also absorb carbon dioxide, but preferentially absorb humidity, thus stopping of absorbing carbon dioxide any further. Therefore, a honeycomb rotor using these latter agents may be wash-coated in the exit side of the rotor, or may be built up as a separate rotor and made a unit by combining with other type of rotor.

To add to this, the zeolite families of CaA, NaX, CaX, LiLSX and NaLSX also absorb nitrogen, thus rotors using these agents can absorb nitrogen as well as carbon dioxide. However, as stated above, these agents preferentially absorb humidity and then stop absorbing other substance any further.

A hopeful configuration is to wash-coat the inlet portion of the rotor with weakly basic ion exchange resin, which absorb both humidity and carbon dioxide, and the exit portion with the zeolite families of CaA, NaX, CaX, LiLSX and NaLSX, so that the ion exchange resin at the inlet portion absorb both humidity and carbon dioxide and then zeolites more preferentially wash-coated at the exit portion mainly absorb carbon dioxide and nitrogen gases. By employing this configuration, zeolites can most effectively absorb both nitrogen and carbon dioxide gases, without excessive effects of humidity.

In addition, one may wash-coat the honeycomb rotor 1 with active carbon or hydrophobic zeolite. In this way, the honeycomb rotor has a capability of absorbing odorous smells and VOCs as well.

The honeycomb rotor 1 is divided into a desorption zone 2, a purge zone 3, and an absorption zone 4. Both the purge zone 3 and the absorption zone 4 are supplied with room air using a blower (the blower is conventional, so that it is not shown in the figure).

The air in the room 7 is, after passing through the absorption zone 4 of the honeycomb rotor 1, subdivided into a channel leading to the purge zone 3 and that for the supply route to the room 7.

The air, after passing through the purge zone 3, is heated using a heater 5, then passes through the desorption zone 2 and is exhausted into outside of the room. The air, after passing through the absorption zone 4, is supplied to the room 7, where a cooling system 6 such as an evaporator or a cooling coil may be employed in between in case of excessive temperature rise.

The desiccant air conditioner based on the present invention is constituted as described above, and its operation is described in the following.

First, we consider a case when one needs to make a room air drier, such as to avoid moist formation in winter or to dry washed clothes in a room. In such circumstances, while the honeycomb rotor 1 is being rotated, the room air is passed through the absorption zone 4 and the purge zone 3. The air is dried while passing through the absorption zone 4 and some fractions of carbon dioxide and nitrogen are removed, and the air is fed back to the room. At the same time, the heater 5 is switched on, and the heated air passes through the desorption zone 2 and desorbs the absorbed humidity and carbon dioxide there, then being exhausted into outside of the room.

In this way, the room air is dried and some fractions of carbon dioxide and nitrogen in the room are exhausted into outside of the room. In addition, the temperature of the air after passing through the absorption zone 4 is raised by the absorption heat, thus yielding the effect of heating for air-conditioning.

When one needs to dehumidify air in a room in a rainy season, the room air is heated by passing through the absorption zone 4, but the heated air is cooled by the cooling system 6, thus reaching the room as a cool air.

Because the air passing through the cooling system 6 is dry, the latent load in the cooling system 6 (the load caused by the dew formation of humidity in the air) does not exist. Therefore, the capacity of the cooling system 6 can be small. If a heat pump is employed where the cooling system 6 works as an evaporator and the heater 5 as a radiator, the overall energy consumption can be made small.

There are cases when VOCs are exhausted into a room, such as a new furniture is brought into the room or wall papers are replaced. In such cases, the VOCs in the room are absorbed in the honeycomb rotor 1, and desorbed in the desorption zone 2, thus being brought out to outside of the room.

As explained above, it is possible to exhaust some fractions of carbon dioxide/nitrogen and VOCs without the necessity of ventilation, thus avoiding the energy loss associated with it. Also, the case when outside air contains harmful substances, it does not cause any problem because of the ventilation being not involved in the process. In such a case, even when outside air tries to get into the room, it may be captured in the honeycomb rotor 1, thus keeping the room air clean.

Also, an air cleaner is employed in order to keep the air in the room 7 clean in case the outside air is dirty or polluted. In such a case, if there are many people in the room 7 who breathe and exhaust carbon dioxide, the latter is exhausted using the air conditioner based on the present invention, thus keeping the oxygen density to within the allowable limit. In addition, the amount of air which is brought into the room 7 is the same amount of that of carbon dioxide and nitrogen being exhausted using the honeycomb rotor, and it is of small quantity so that an air cleaner can easily purify it.

Figure 2:
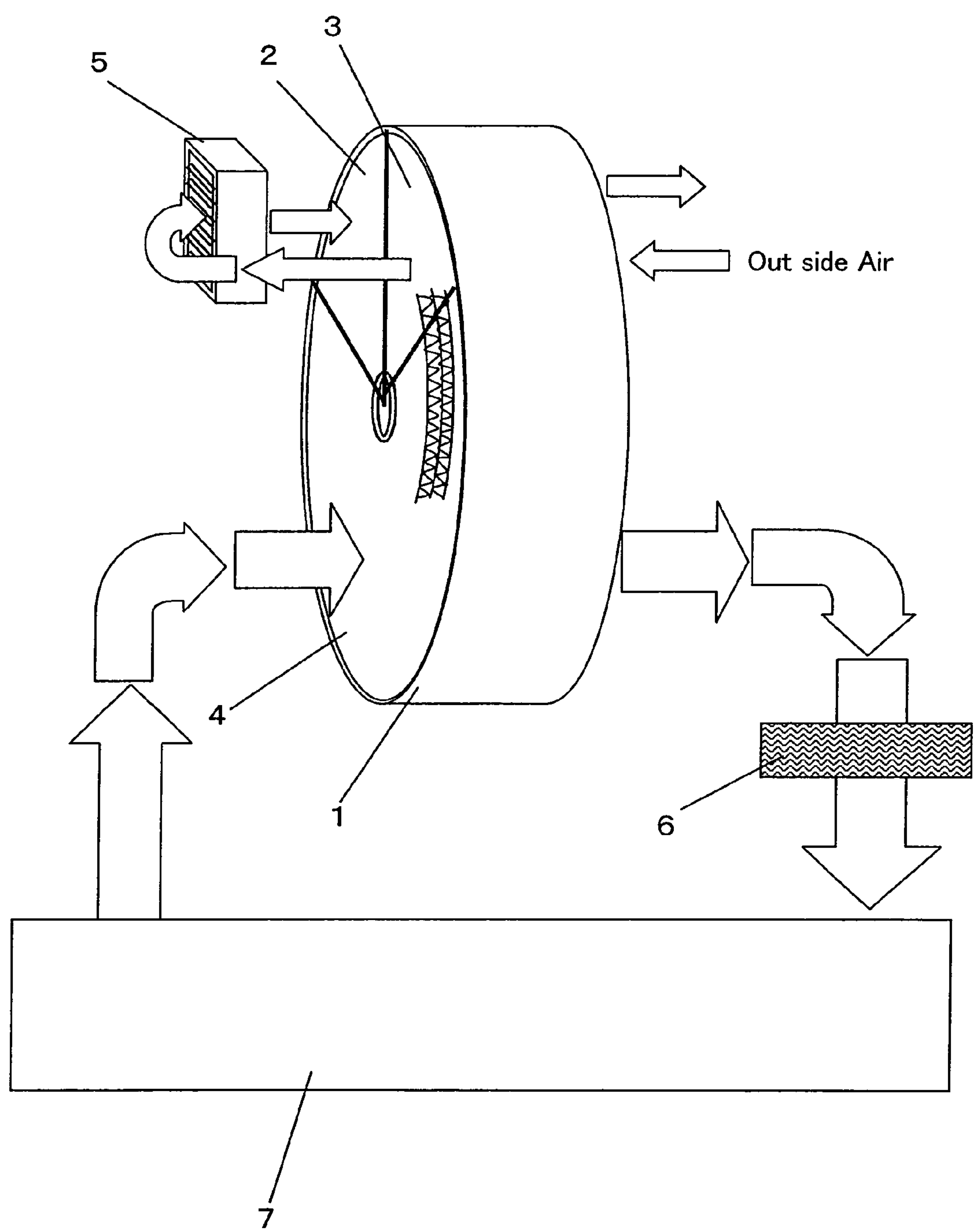
FIG. 2 shows the air flow of second embodiment of the invention.

FIG. 2 shows the flow diagram of the second application of the present invention. In the above example of the first application, the room air was made to pass through the purge zone 3. In contrast, the outside air is made to pass through the purge zone 3 in this second application. In this second application, the amount of air reduced from the room is only those of carbon dioxide and nitrogen being absorbed in the honeycomb rotor 1 and exhausted to outside of the room.

For this reason, the amount of ventilated air for the second application is even smaller than that for the first one. This second application is most suitable for the case when the outside air is polluted and/or dirty.

In the case of air conditioning for a car, it is hopeful to carry out the air heating and ventilation at the same time, so as to avoid the moisture formation. However, much energy of heating is lost by the process of ventilation. Also, the moisture avoidance in rainy season and air conditioning for cooling/humidity reducing conditions in summer also require ventilation to lower the density of carbon dioxide in the room, thus losing much energy for cooling.

If this invention is applied to air conditioning for a car, it is possible to carry out the air conditioning and dehumidification of the cabin room while carbon dioxide and some portions of nitrogen, the latter quantity being corresponded to the consumed oxygen, are exhausted, thus allowing the densities of carbon dioxide and oxygen in the cabin to be kept to within the respective allowable limits. In this way, the amount of air necessary to take into the cabin can be made small, just to compensate the amount exhausted through the honeycomb rotor by the absorption/desorption processes, thus enabling to carry out the heating and cooling requirements without much energy loss while at the same time to carry out the carbon dioxide reduction and maintenance of oxygen density.

In a case of a gasoline-powered car, much exhaust heat is produced and no special equipment is required for air heating. However, in a case of an electric car, a large amount of exhaust energy does not exist, necessitating saving of this required energy for air heating. For the latter case, it is necessary to reduce the amount of ventilating air, so that heated air is not allowed to exit excessively. The present invention provides much energy saving due to minimum ventilation.

Figure 3:
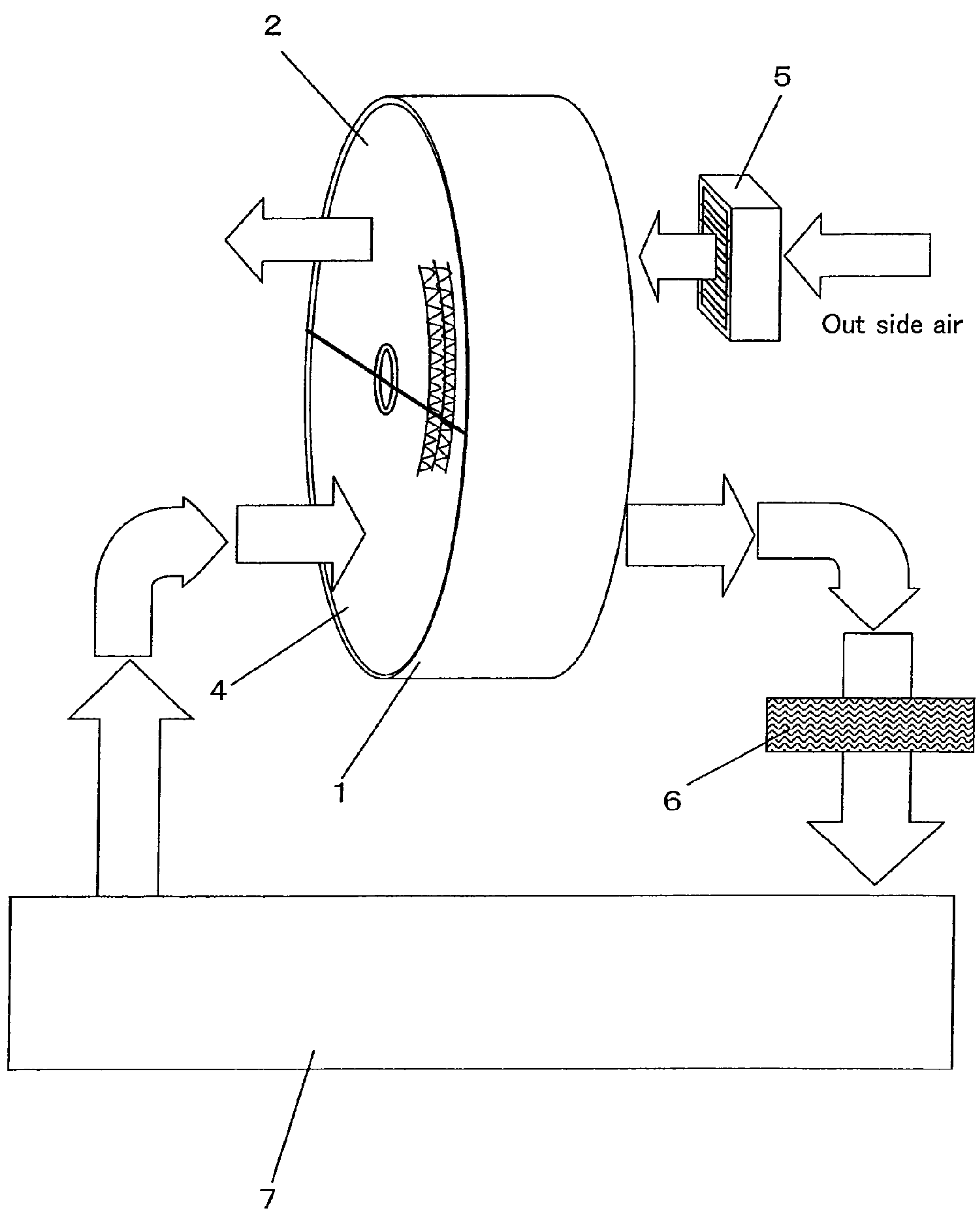
FIG. 3 shows the air flow of third embodiment of the invention.

FIG. 3 shows the flow diagram for the third application 3. In both the above first application 1 and second application 2, the honeycomb rotor 1 had a purge zone 3. In contrast, the purge zone 3 is not equipped in the third application 3, and the outside air is guided into the desorption zone 2. In this third application 3, similarly as for the second application 2, the amount of reduced room air is due to carbon dioxide and nitrogen absorbed in the honeycomb rotor 1 and desorbed in the desorption zone 2.

In the third application 3, the heater 5 and the cooling system 6 can also be functioned by a heat pump and a radiator, allowing to reduce the energy consumption.

In all three applications above, the ratio of exhausted carbon dioxide and nitrogen can be controlled by the temperature of the heater 5. In other words, because the desorption temperatures for both carbon dioxide and nitrogen are different, the adjustment of the temperature of the heater facilitates the control of desorbed amounts of these two gases.

Figure 4:
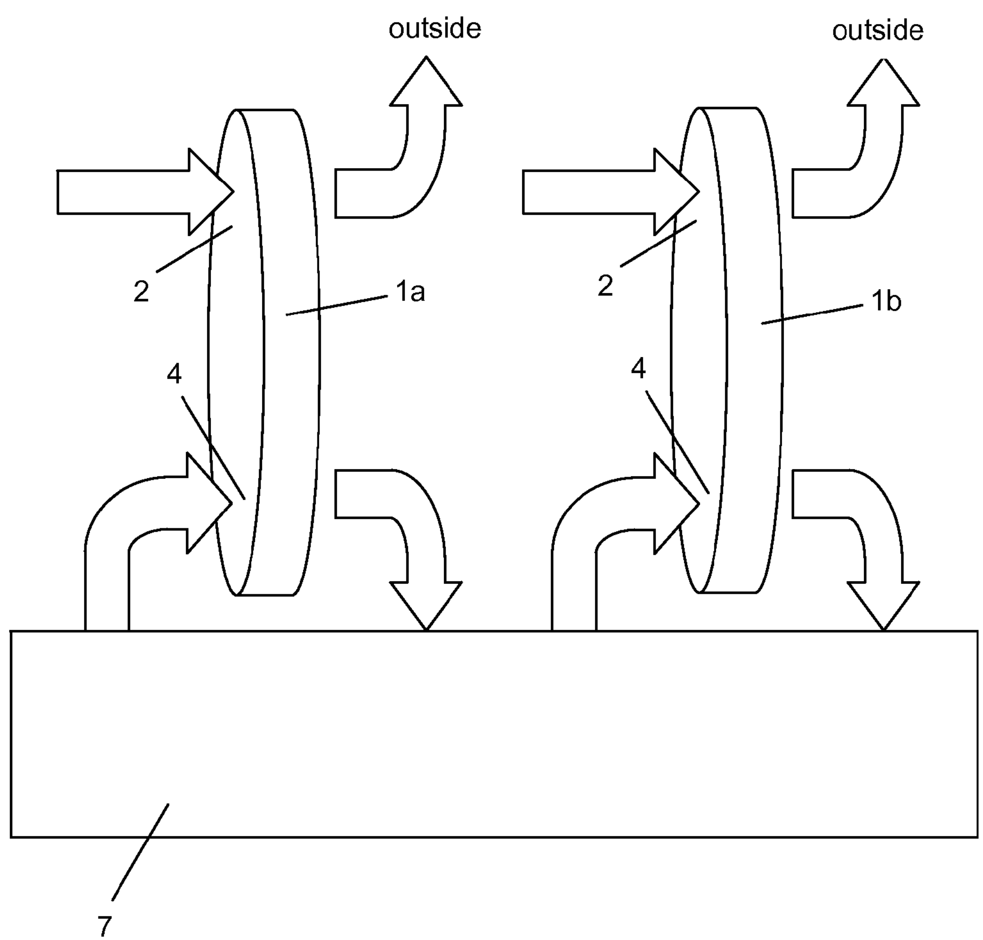
FIG. 4 shows the air flow of an embodiment with two rotors.

As illustrated in FIG. 4, two honeycomb rotors may be used. A first honeycomb rotor 1*a* may have a capability of at least humidity absorption or absorbing process, and a second honeycomb rotor 1*b* may have a capability of carbon dioxide absorption or absorbing process and a nitrogen absorption capability.

This invention is concerned with the desiccant air conditioner, where carbon dioxide and some portions of nitrogen, the latter quantity being corresponded to the consumed oxygen, are exhausted, thus allowing the densities of carbon dioxide and oxygen in the room to be kept within the respective allowable limits. In this way, the invention provides a basis for the decicant air conditioner which significantly reduces the energy loss associated with ventilation.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A desiccant air conditioner comprising:

a honeycomb rotor divided into at least an absorption zone and a desorption zone, the absorption zone having an inlet portion provided with a first absorbent that absorbs humidity and carbon dioxide, and an exit portion provided with a second absorbent that absorbs nitrogen, wherein air in a room is, after being passed through the inlet portion of the absorption zone and then the exit portion of the absorption zone, fed back to the room, and air which is passed through the desorption zone is exhausted into a space that is outside of the room and outside of the air conditioner.

2. The desiccant air conditioner according to claim 1, wherein a purge zone is provided, and the air in the room is, after being passed through the purge zone, heated and passed through the desorption zone, then exhausted into a space that is outside of the room and outside of the air conditioner.

3. The desiccant air conditioner according to claim 1, wherein further air in a room is, after being passed through the absorption zone, passed through the desorption zone and exhausted into a space that is outside of the room and outside of the air conditioner.

4. The desiccant air conditioner of claim 1, wherein the first absorbent is an ionic exchange resin coated on the inlet portion, and the second absorbent is at least one zeolite selected from zeolite families of CaA, NaX, CaX, LiLSX and NaLSX coated on the exit portion.

5. A desiccant air conditioner comprising:

a honeycomb rotor having a capability of at least humidity absorption or absorbing process; and another honeycomb rotor having a capability of carbon dioxide absorption or absorbing process and a nitrogen absorption capability, wherein both honeycomb rotors are divided into at least absorption zones and desorption zones, air in a room is, after being passed through the respective absorption zones, fed back to the room, and air which is passed through the respective desorption zones is exhausted into a space that is outside of the room and outside of the air conditioner.

6. The desiccant air conditioner according to claim 5, wherein further air in a room is, after being passed through the respective absorption zones, passed through the respective desorption zones and exhausted into outside of the room and outside of the air conditioner.

7. A desiccant air conditioner comprising:

a honeycomb rotor divided into at least an absorption zone and a desorption zone, the absorption zone having an inlet portion provided with a first absorbent that absorbs humidity and carbon dioxide, and an exit portion provided with a second absorbent that absorbs nitrogen, the air conditioner configured to intake air of a room into the air conditioner and then pass the air through the inlet portion of the absorption zone and then the exit portion of the absorption zone, thereby causing the honeycomb rotor to absorb carbon dioxide and nitrogen of the air of the room, pass at least a portion of the air of the room having passed through the absorption zone back into the room, and pass air through the desorption zone, thereby causing the carbon dioxide and the nitrogen of the air of the room previously absorbed by the honeycomb rotor to be desorbed into the air passed through the desorption zone, and subsequently exhaust the air passed through the desorption zone into an outside space that is outside of the room and outside of the air conditioner.

8. The desiccant air conditioner of claim 7, configured to pass a first portion of the air of the room having passed through the absorption zone back into the room, and pass a second portion, of the air of a room having passed through the absorption zone, through the desorption zone and subsequently into the outside space, without passing the second portion into the room after passage of the second portion through the absorption zone and before passage of the second portion to the outside space.

9. The desiccant air conditioner of claim 7, configured to intake a second air from a space that is outside of the room and outside of the air conditioner, and pass the second air through the desorption zone and subsequently into the outside space, without passing the second air into the room after entry of the second air into the conditioner and before passage of the air into the outside space.

10. The desiccant air conditioner of claim 8, wherein the desiccant air conditioner further comprises a heater, and the desiccant air conditioner is configured to pass the second portion of the air having passed through the absorption zone to the heater to be heated by the heater, before passing the second portion through the desorption zone.

11. The desiccant air conditioner of claim 7, wherein the first absorbent is an ionic exchange resin coated on the inlet portion, and the second absorbent is at least one zeolite selected from zeolite families of CaA, NaX, CaX, LiLSX and NaLSX coated on the exit portion.

12. The desiccant air conditioner of claim 10, wherein the first absorbent is an ionic exchange resin coated on the inlet portion, and the second absorbent is at least one zeolite selected from zeolite families of CaA, NaX, CaX, LiLSX and NaLSX coated on the exit portion.

* * * * *